United States Patent
Rajagopalan et al.

Patent Number: 5,971,869
Date of Patent: *Oct. 26, 1999

[54] GOLF BALL COMPOSITION

[75] Inventors: Murali Rajagopalan, South Dartmouth, Mass.; Robert Joseph Statz, Kenneth Square, Pa.

[73] Assignees: Acushnet Company, Fairhaven, Mass.; E. I. du Pont de Nemours and Company, Wilmington, Del.

[*] Notice: This patent is subject to a terminal disclaimer.

[21] Appl. No.: 08/857,457

[22] Filed: May 16, 1997

Related U.S. Application Data

[63] Continuation-in-part of application No. 08/488,162, Jun. 7, 1995, Pat. No. 5,631,324.

[51] Int. Cl.$^6$ ............................. C08L 23/08; A63B 37/00
[52] U.S. Cl. ........................... 473/371; 525/222; 525/228
[58] Field of Search ..................... 473/385, 371; 525/221, 228, 201, 222

[56] References Cited

U.S. PATENT DOCUMENTS

| | | | |
|---|---|---|---|
| 3,454,280 | 7/1969 | Harrison et al. | 273/235 |
| 3,819,768 | 6/1974 | Molitor | 260/897 B |
| 4,337,946 | 7/1982 | Saito et al. | 273/225 |
| 4,801,649 | 1/1989 | Statz | 525/183 |
| 5,150,905 | 9/1992 | Yuki et al. | 523/206 |
| 5,155,157 | 10/1992 | Statz et al. | 524/423 |
| 5,439,227 | 8/1995 | Egishara et al. | 273/228 |
| 5,553,852 | 9/1996 | Higuchi et al. | 473/373 |
| 5,803,831 | 9/1998 | Sullivan et al. | 473/378 |

FOREIGN PATENT DOCUMENTS

| | | |
|---|---|---|
| 0557069 | 8/1993 | European Pat. Off. . |
| 0652254 | 5/1995 | European Pat. Off. . |

*Primary Examiner*—Jeffrey Mullis
*Attorney, Agent, or Firm*—Pennie & Edmonds LLP; Craig H. Evans

[57] ABSTRACT

The present invention relates to golf balls having a cover and a core and to golf balls having a cover, a core, and an intermediate layer between the cover and the core, where the core or at least one of the intermediate layer or the core is formed from at least one terpolymer of a first monomeric component of an olefinic monomer having from about 2 to about 8 carbon atoms, a second monomeric component of an unsaturated acrylate class ester having from about 2 to about 18 carbon atoms, and a third monomeric component of at least one monomer selected from the group consisting of carbon monoxide, anhydride monomers, and monomers having a structure according to the formula

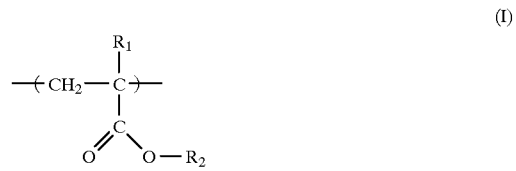

(I)

where $R_1$ is hydrogen or a linear chain or branched chain alkyl group of from about 1 to about 18 carbon atoms, and $R_2$ is selected from the group consisting of linear chain alkyl, branched chain alkyl, carbocyclic, and unsubstituted aryl groups, each containing an epoxy moiety. The intermediate layer and/or core may also comprises a blend of at least one olefinic ionomer and the terpolymer.

31 Claims, No Drawings

GOLF BALL COMPOSITION

This application is a continuation-in-part of U.S. application Ser. No. 08/488,162, filed on Jun. 7, 1995 now U.S. Pat. No. 5,631,324.

FIELD OF THE INVENTION

The present invention relates to golf ball compositions for forming golf ball covers, cores, and intermediate layers. The golf ball compositions comprise terpolymers having at least three different monomeric units, one of which is olefinic, one of which is an ester and one of which is carbon monoxide, an anhydride monomer or a monomer containing an epoxy, i.e., glycidyl group.

BACKGROUND OF THE INVENTION

Three-piece, wound golf balls with balata covers are preferred by most expert golfers. These balls provide a combination of distance, high spin rate, and control that is not available with other types of golf balls. However, balata is easily damaged in normal play, and, thus, lacks the durability required by the average golfer.

In contrast, amateur golfers typically prefer a solid, two-piece ball with an ionomer cover, which provides a combination of distance and durability. Because of the hard ionomer cover, these balls are almost impossible to cut, but also have a very hard "feel", which many golfers find unacceptable, and a lower spin rate, making such balls more difficult to draw or fade. The differences in the spin rate can be attributed to the differences in the composition and construction of both the cover and the core.

Many attempts have been made to produce a golf ball with the control and feel of a wound balata ball and the durability of a solid, two-piece ball, but none have succeeded totally. For example, cover compositions made with low flexural modulus ionomer resins provide improved spin and feel characteristics, but have a relatively low initial velocity that results in a shorter overall distance.

Golf balls having a non-wound intermediate layer between the cover and the core have also been disclosed. For example, U.S. Pat. No. 5,253,871 to Viollaz discloses the use of at least 10 percent of a block copoly(amide-ether) elastomer, optionally blended with an ionomer, for use as the middle layer of a three-layer golf ball. The hardness of the block copolymer is said to be within the range of 30–40 Shore D hardness, while the corresponding hardness of the ionomer component is said to be between 55–65 Shore D. The overall hardness of the middle layer is said to range from 20–50 Shore D. The cover may also be a block copoly(amide-ether) and ionomer blend but its overall hardness must be greater than that of the adjacent middle layer.

Consequently, a need exists for a golf ball composition that provides spin rates and a feel more closely approximating those of balata covered balls, while also providing the distance of an ionomer covered two-piece ball and a degree of durability as high or higher than that provided by the balls presently available or disclosed in the prior art.

SUMMARY OF THE INVENTION

The present invention relates to golf balls having a cover and a core, where the core comprises at least one terpolymer that comprises a first monomeric component comprising an olefinic monomer having from about 2 to about 8 carbon atoms, a second monomeric component comprising an unsaturated acrylate class ester having from about 2 to about 18 carbon atoms, and a third monomeric component comprising at least one monomer selected from the group consisting of carbon monoxide, anhydride monomers, and monomers having a structure according to the formula

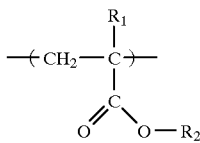

(I)

where $R_1$ is hydrogen or a linear chain or branched chain alkyl group of from about 1 to about 18 carbon atoms, and $R_2$ is selected from the group consisting of linear chain alkyl, branched chain alkyl, carbocyclic, and unsubstituted aryl groups, each containing an epoxy moiety. The core may also comprise a blend of at least one olefinic ionomer and the terpolymer.

Monomer useful as the first monomeric component include vinyl olefin monomers having a terminal point of unsaturation capable of undergoing polymerization reactions, such as ethylene, propylene, butene, pentene, hexene, heptene and octene, as well as other isomers of butene, pentene, hexene, heptene and octene.

Monomers useful as the second monomeric component include acrylate class esters formed from an unsaturated carboxylic acid, such as acrylic acid, methacrylic acid, α-chloroacrylic acid, crotonic acid, maleic acid, fumaric acid, itaconic acid, cinnamic acid, and mixtures thereof. Typical acrylate class esters are of the formula:

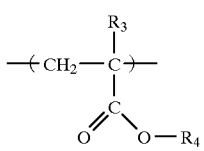

(II)

wherein $R_3$ and $R_4$ are the same or different, and are selected from the group consisting of hydrogen and linear and branched chain alkyl groups having from about 1 to about 20 carbon atoms. Acrylate class esters having the formula above include pentyl acrylate, pentyl methacrylate, n-butyl acrylate, iso-butyl acrylate, n-butyl methacrylate, propyl acrylate, propyl methacrylate, ethyl acrylate, ethyl methacrylate, methyl methacrylate, methyl acrylate, iso-bornyl acrylate, iso-bornyl methacrylate and tetrahydrofurfuryl acrylate.

Monomers useful as the third monomeric component include carbon monoxide, an anhydride monomer having the formula

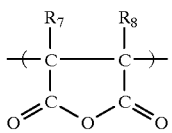

(VI)

wherein $R_7$ and $R_8$ are the same or different, and are selected from the group consisting of hydrogen, linear and branched chain alkyl, and carbocyclic groups, and monomers having the general formula

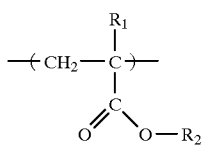
(I)

wherein $R_1$ is hydrogen or a linear chain or branched chain alkyl group of from about 1 to about 18 carbon atoms, and $R_2$ is selected from linear and branched chain alkyl, carbocyclic, and aryl groups, each containing an epoxy moiety.

Terpolymers useful in the golf balls of the invention include terpolymers having the formula

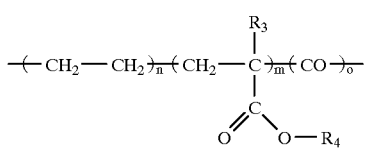
(III)

wherein $R_3$ and $R_4$ are selected from among hydrogen and linear and branched chain alkyl groups having from about 1 to about 20 carbon atoms, and terpolymers having the formula

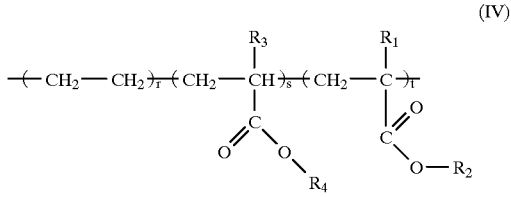
(IV)

wherein $R_1$ is hydrogen or a linear chain or branched chain alkyl group of from about 1 to about 18 carbon atoms, and $R_2$ is selected from the group consisting of linear chain and branched chain alkyl, substituted and unsubstituted carbocyclic and unsubstituted aryl groups, each containing an epoxy moiety, and wherein $R_3$ and $R_4$ are selected from the group consisting of hydrogen and linear and branched chain alkyl groups having from about 1 to about 20 carbon atoms.

The invention also relates to golf balls comprising a cover, a core, and an intermediate layer between the cover and the core, where at least one of the core and the intermediate layer comprises at least one terpolymer, as described above, or a blend of at least one olefinic ionomer and the terpolymer. Where the intermediate layer comprises the terpolymer, the core may be formed from any material known in the art, including the terpolymer, blends of the terpolymer and one or more olefinic ionomers, and polybutadiene based compositions.

Golf ball cover materials useful in the golf balls of the invention include the terpolymer, ionomers, thermoplastic copolymers and terpolymers, polyamides, polyurethanes, homo and copolyesters, polyamides, copolyetheresters, copolyesterester, copolyetheramides, 30 copolyetheramide elastomers, polyurea, epoxy polymers, and mixtures thereof.

DETAILED DESCRIPTION OF THE INVENTION

The invention is directed to compositions for forming golf balls comprising a cover and a core and, optionally, an intermediate layer situated between the cover and the core. As used herein, an "intermediate layer" is a layer interposed between a cover and a core of a golf ball. An intermediate layer may be distinguished from a cover or a core by some difference in the materials comprising the layers. An intermediate layer may, for example, have a distinct composition, a different proportion of components, a different molecular weight of a component, a different molecular weight distribution of a component, or a different degree of curing or crosslinking when compared to the corresponding attribute of the component comprising the cover or core layers.

A "cover" or a "core" as these terms are used herein may be formed from a single layer or from two or more layers, and, thus, may comprise a plurality of layers. As used herein, a core comprising a single layer means a unitary or one-piece core, and the layer includes the entire core from the center of the core to its outer periphery. A core, whether formed from a single layer or from two or more layers, may serve as a center for a wound ball. An intermediate layer may be incorporated, for example, with a single layer or multilayer cover, with a single layer or multilayer core, with both a single layer cover and core, or with both a multilayer cover and a multilayer core. Intermediate layers of the type described above are sometimes referred to in the art, and, thus, herein as well, as an inner cover layer, as an outer core layer, or as a mantle layer.

According to the present invention, at least one of the cover, the core, or the optional intermediate layer of the golf balls of the invention comprises at least one terpolymer comprising: (a) a first monomeric component comprising an olefinic monomer having from about 2 to about 8 carbon atoms; (b) a second monomeric component selected from a first unsaturated acrylate class ester having from about 2 to about 18 carbon atoms; and (c) a third monomeric component which comprises at least one of carbon monoxide, an anhydride monomer and a second acrylate class ester monomer, wherein the organic moiety attached at the ester linkage contains an epoxy, i.e., glycidyl, group.

The terpolymer may be blended with at least one olefinic ionomer component, which preferably includes E/X/Y copolymers, where E is ethylene, X is a softening comonomer, such as acrylate or methacrylate present in an amount of 0 to about 50, preferably 0 to about 25, most preferably 0 to about 2 weight percent of the polymer, and Y is acrylic or methacrylic acid present in an amount of about 5 to about 35, preferably about 10 to about 35, most preferably about 15 to about 35 weight percent of the polymer, wherein the acid moiety is neutralized about 1 to about 90 percent, preferably at least about 40 percent, most preferably at least about 60 percent, by a cation, such as lithium*, sodium*, potassium, magnesium*, calcium, barium, lead, tin, zinc* or aluminum (*=preferred), or a combination of such cations.

The flex modulus (measured by ASTM D-790) of olefinic ionomers useful in the invention preferably ranges between about 500 and about 150,000 psi. The Shore D hardness (measured by ASTM D-2240) is between about 20 and about 80. Useful ionomers may be characterized as having either a "low" melt flow index, i.e., having a melt flow index of from about 0.3 to less than two grams per 10 minutes, or as "high" melt flow index ionomers, having a melt flow index of from 2 to about 10 grams per minute. Ionomers useful with the invention include, but are not limited to ethylene/acrylic acid, ethylene/methacrylic acid, ethylene/acrylic acid/n-butyl acrylate, ethylene/methacrylic acid/n-butyl acrylate, ethylene/methacrylic acid/n-butyl acrylate, ethylene/methacrylic acid/iso-butyl acrylate, ethylene/ acrylic acid/iso-butyl acrylate, ethylene/methacrylic acid/n-butyl methacrylate, ethylene/acrylic acid/methyl methacrylate, ethylene/acrylic acid/methyl acrylate, ethylene/methacrylic acid/methyl acrylate, ethylene/methacrylic acid/methyl methacrylate, and ethylene/acrylic acid/n-butyl methacrylate ionomers. Preferred ionomers include ethylene/methacrylic acid, ethylene/acrylic acid, ethylene/methacrylic acid/n-butyl acrylate, ethylene/acrylic acid/n-butyl acrylate, ethylene/methacrylic acid/methyl acrylate and ethylene/acrylic acid/methyl acrylate ionomers. The most preferred ionomers are ethylene/methacrylic acid, ethylene/acrylic acid, ethylene/(meth)acrylic acid/n-butyl acrylate, ethylene/(meth)acrylic acid/ethyl acrylate, and ethylene/(meth)acrylic acid/methyl acrylate ionomers. The manner in which the ionomers are made is well known in the art, as described in, e.g., U.S. Pat. No. 3,262,272 to Rees.

Turning now to the terpolymer of the invention, the first monomeric component is an olefin, i.e., an unsaturated hydrocarbon having the general formula $C_nH_{2n}$, characterized by a relatively high level of chemical activity. The preferred class of olefins are those known as vinyl monomers, and in particular those having a terminal point of unsaturation capable of undergoing polymerization reactions. U.S. Pat. No. 4,393,099 provides a representative description of α,β-olefinically unsaturated resins (see in particular column 5 lines 22–70 and column 6 lines 1–70), and, thus, the disclosure of this patent is expressly incorporated herein by reference. While a variety of olefinic monomers are capable of being used according to the present invention, olefinic monomers found to be most useful in forming the present terpolymer include, but are not specifically limited to, ethylene ($CH_2=CH_2$); propylene ($CH_2=CHCH_3$); butene ($CH_2=CHCH_2CH_3$); pentene ($CH_2=CH(CH_2)_2CH_3$); hexene ($CH_2=CH(CH_2)_3CH_3$); heptene ($CH_2=CH(CH_2)_4CH_3$) and octene ($CH_2=CH(CH_2)_5CH_3$). The most preferred of these materials is ethylene due to its low cost, ready availability, and the ease with which it is incorporated into the terpolymer of the invention.

The second monomeric component of the presently claimed terpolymer comprises an unsaturated carboxylic acid based acrylate class ester. Preferred acrylate class esters for use in the invention include those based upon monomers including acrylic, methacrylic, α-chloroacrylic, crotonic, maleic, fumaric, itaconic and cinnamic acids.

The preferred esters are the acrylate class esters having the general formula

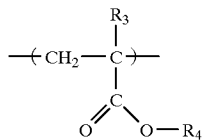

(II)

wherein $R_3$ is hydrogen or a linear or branched chain alkyl group having from about 1 to about 20 carbon atoms, and $R_4$ is generally selected from the same materials as $R_3$, with the exception that $R_4$ cannot be hydrogen. For purposes of the present invention, the range of linear or branched chain alkyl groups useful in the invention includes each and every such alkyl group having from 1 to about 20 carbon atoms, even though such groups are not all specifically identified herein.

The acrylate class esters for use with the terpolymers of the present invention are based upon unsaturated acrylic class acids, such as ethyl acrylic acid, methyl acrylic acid, and the like. The process for converting these acids to ester components is well known in the art, and, thus, need not be described here. Preferred acrylate ester compositions include, but are not limited to, pentyl acrylate, pentyl methacrylate, n-butyl acrylate, iso-butyl acrylate, n-butyl methacrylate, propyl acrylate, propyl methacrylate, ethyl acrylate, ethyl methacrylate, methyl methacrylate, methyl acrylate, iso-bornyl acrylate, iso-bornyl methacrylate and tetrahydrofurfuryl acrylate.

The third monomeric component of the terpolymer of the invention comprises at least one of the following monomer "types": (a) carbon monoxide (CO), as taught for example, in U.S. Pat. Nos. 4,070,532 and 4,167,428 to Hammer, the disclosure of which is expressly incorporated herein by reference; (b) an anhydride monomer such as maleic anhydride or any of those anhydrides described below with regard to formula VI; or (c) a monomer having the general formula

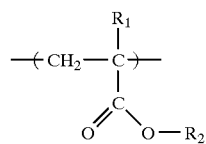

(I)

wherein $R_1$ is hydrogen or a linear or branched chain alkyl group comprising from about 1 to about 18 carbon atoms, e.g., methyl, ethyl, propyl, butyl, etc., and $R_2$ is selected from linear chain or branched chain alkyl, substituted or unsubstituted carbocyclic and substituted or unsubstituted aryl groups containing an epoxy, i.e., glycidyl moiety.

As used herein, the phrase linear chain or branched chain alkyl group of from about 1 to about 18 carbon atoms means any substituted or unsubstituted acyclic carbon-containing compounds, including alkanes, alkenes and alkynes. Examples of alkyl groups include lower alkyl, for example, methyl, ethyl, n-propyl, iso-propyl, n-butyl, iso-butyl or tert-butyl; higher alkyl, for example, octyl, nonyl, decyl, and the like; and lower alkylene, for example, ethylene, propylene, propyldiene, butylene, butyldiene, and the like. The ordinary skilled artisan is familiar with numerous linear and branched alkyl groups which are within the scope of the present invention.

In addition, such alkyl groups as described above may additionally contain various substituents in which one or more hydrogen atoms has been replaced by a functional group. Functional groups include but are not limited to hydroxyl, sulfonic, siloxane, amino, carboxyl, amide, esther, ether, and halogen (fluorine, chlorine, bromine and iodine), to mention but a few.

As used herein, substituted and unsubstituted carbocyclic groups means cyclic carbon-containing compounds, including, but not limited to, cyclopentyl, cyclohexyl, cycloheptyl, admantyl, and the like. Such cyclic groups may also contain various substituents in which one or more hydrogen atoms has been replaced by a functional group. Such functional groups include those described above, as well as the lower alkyl groups described above. The cyclic groups of the invention may further comprise a heteroatom. For example, in a specific embodiment, one of either $R_1$, $R_2$, $R_3$ or $R_4$ is cyclohexanol.

As used herein, substituted and unsubstituted aryl groups means a hydrocarbon ring bearing a system of conjugated double bonds, usually comprising 4n+2π (pi) electrons, where n is an integer equal to or greater than zero. Examples of aryl groups include, but are not limited to, phenyl, naphthyl, anisyl, toluyl, xylenyl and the like. According to the present invention, aryl also includes heteroaryl groups, e.g., pyrimidine or thiophene. These aryl groups may also be substituted with any number of a variety of functional groups. In addition to the functional groups described above in connection with substituted alkyl groups and carbocyclic groups, functional groups on the aryl groups can be nitro groups.

In addition, any of $R_1$, $R_2$, $R_3$ and $R_4$ can also represent any combination of alkyl, carbocyclic or aryl groups, such as, for example, 1-cyclohexylpropyl, benzyl cyclohexylmethyl, 2-cyclohexylpropyl, 2,2-methylcyclohexylpropyl, 2,2-methylphenylpropyl, 2,2-methylphyenylbutyl.

The monomeric units described above may be combined according to any of the methods described below to form polymers having a structure according to formula III:

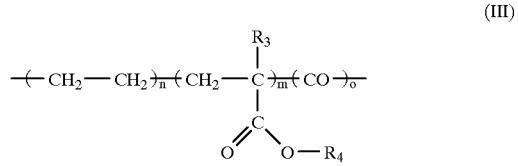

(III)

or according to Formula IV below:

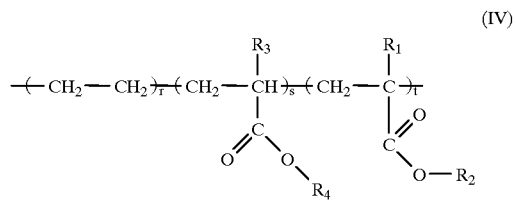

(IV)

wherein $R_1$, $R_2$, $R_3$, and $R_4$ are as defined above.

The letters n, m, and o in formula III and r, s, and t in formula IV are each real numbers greater than zero. These numbers represent the relative weight percentages of the separate monomeric components of the terpolymers of the present invention. The letters n, m, o, r, s, and t represent values that will result in a polymer having properties desirable for use in golf balls. The letters m and s represent the amount of the olefin comonomer. Preferably, the terpolymer comprises from about 5 to about 75 weight percent, more preferably, from about 5 to about 50 weight percent, and most preferably, from about 5 to about 40 weight percent of the olefin comonomer.

The letters m and s represent the amount of the second monomeric unit, whether said second monomer unit is an ester or a neutralized acid. Preferably, the terpolymer comprises from about 1 percent to about 50 weight percent, more preferably, from about 1 percent to about 35 weight percent of the second monomer.

Letters o and t, respectively, represent the amounts of carbon monoxide or epoxy containing monomer present in the present invention. Preferably, the terpolymer comprises from about 1 to 25 weight percent, more preferably from about 1 to about 20 weight percent, and most preferably from about 1 to about 15 weight percent of the carbon monoxide or epoxy containing monomer.

Various polymers according to formulas III and IV above are known to the person of ordinary skill in the art, and are available commercially as the FUSABOND® family of resins and the ELVALOY® family of resins from DuPont de Nemours of Delaware. Various grades of these resins are available, and may be used according to the particular properties desired for the final golf ball cover, core, or intermediate layer.

The golf ball covers, cores, and intermediate layers according to the present invention may include mixtures of polymers chosen according to considerations such as speed of manufacture using particular blends and the properties desired in the final golf ball cover.

The terpolymers having formulas III or IV may be blended with olefinic mono, di or tri carboxylic acid ionomers, such as ethylene methacrylic acid or ethylene acrylic acid ionomers sold under the tradename SURLYN®, including SURLY™ 8320, 8120, 9320, 7930, 8020, 8550, 8660, 8940, 9020, 9520, 9730, 9970, AD 8512, AD 8511, AD 8195 and AD 8444, as well as other polymeric materials known to the person of ordinary skill in the art.

In addition, several different types of polymers may be blended together to form a stock for forming the covers, cores, or intermediate layers of the golf balls of the invention. In a preferred embodiment 3 different polymers and/or ionomers are blended to form a golf ball composition having advantageous properties. The three different polymers are selected from the group consisting of polymers described by formulae III and IV above and ionomers, such as those sold under the tradename SURLYN™ resins and IOTEK™ resins from Dupont and Exxon respectively.

The terpolymers of the present invention can be made according to any of the various means known to the ordinary skilled artisan in this field, such as by addition free radical polymerization, cationic or anionic polymerization, or catalyst driven polymerization to name but a few. As the polymer chemist knows each of these different methods can be used to produce different types of terpolymers such as graft polymers, block polymers, random polymers, etc.

Any of the polymers produced as indicated above can be used according to the present invention, depending on the desired properties of the resultant golf ball cover, core or intermediate layer.

As a general proposition, polymerization of vinyl monomers occurs in the presence of small amounts of a wide variety of reagents known as initiators. Since initiators are often destroyed, it is not proper to refer to these substances as "catalysts", although the latter term is sometimes used. Initiators are believed to form some reactive species, such as an ion or a free radical, which can add to carbon-carbon double bonds to form a new ion or radical, and which can in turn add to another unit.

The terpolymers of the present invention are preferably made by adding three monomers, in gaseous form, selected from the three different classes of monomers described above for use in the present invention, to a reaction vessel. An initiator is added together with the gases to promote a free radical polymerization reaction.

The preferred initiators for use in forming the polymers of the present invention are those which produce reactive free radicals at a controllable rate. These free-radical initiators can be generally classified into several categories.

The first category is peroxide compounds of formula

(V)

where $R_5$ and $R_6$ are selected from among linear or branched chain alkyl, and substituted or unsubstituted carbocyclic or aryl groups as defined above. This class of initiators is the most preferred class for use in making the compounds according to the present invention. Of the linear or branched chain alkyl, substituted or unsubstituted aryl or carbocyclic groups, the most preferred include those in which $R_5$ and $R_6$ are the same or different and are hydrogen, methyl, ethyl or are selected from the group consisting of dicamyl peroxide, di(n-propyl)peroxydicarbonate, 2,4-pentanedione peroxide, di(sec-butyl)peroxydi-carbonate, di(2-ethylhexyl) peroxydicarbonate, α-cumyl peroxy-neodecanoate, 1,1-dimethyl-3-hydroxy-butyl peroxyneo-heptanoate, α-cumyl peroxy-neoheptanoate, t-amyl peroxy-neodecanoate, t-butyl peroxy-neodecanoate, t-amyl peroxy-pivalate, t-butyl peroxy-pivalate, 1,1-dimethyl-3-hydroxy-butyl peroxy-2-ethylhexanoate, 2,5-dimethyl 2, 5-di(2-ethylhexanoyl peroxy) hexane, t-amyl peroxy-2-ethyl-hexanoate, t-butyl peroxy-2-ethylhexanoate, t-butyl peroxy-isobutyrate, t-butyl peroxyacetate, t-amyl peroxyacetate, t-butyl perbenzoate, t-amyl perbenzoate, di-t-butyl diperoxy-phthalate, oo-t-butyl o-isopropyl monoperoxycarbonate, 2,5-dimethyl-2,5-di(benzoylperoxy) hexane, oo-t-butyl 1-(2-ethylhexyl) monoperoxycarbonate, oo-t-amyl o-(2-ethylhexyl) monoperoxycarbonate, dicumyl peroxide, 2,5-dimethyl-2,5-di-(t-Butylperoxy) hexane.

Other useful initiator compounds include azo compounds and photosensitizers. Azo compounds form free radicals by undergoing thermal decomposition at temperatures not far above room temperature, where photosensitizers absorb light, and decompose or react with other molecules to form radicals.

The reaction to produce the present copolymers is preferably carried out at elevated temperatures. The preferred temperature range is from about 100° C. to about 270° C. The most preferred temperatures range from about 130° to about 230° C.

Terpolymers according to the claimed invention are preferably formed under elevated pressures. It is preferred to make the present polymers under pressures greater than about 70 MPa. It is more preferable to carry out the present invention at pressures of from about 140 MPa to about 350 MPa.

Various other reactions of free radicals can compete with the addition reaction. Such "side reactions" may involve the monomer, the polymer, or foreign additives and impurities. These side reactions may have an influence on the course of a polymerization, and can be used to control polymer properties and monomer stability according to methods known to the ordinary skilled artisan.

Inhibitors can be used in the reaction producing the present polymers to degrade growing radicals to inactive products. Common inhibitors are oxygen, iodine, quinones, and polycyclic aromatic hydrocarbons. A typical inhibitor is benzoquinone.

In an alternate embodiment of the present invention, graft copolymers of the terpolymers described above are used in the golf balls of the invention. In particular, graft polymers are produced, such that the graft segment making up the linkage between polymer chains comprises an anhydride, wherein "anhydride" is taken to mean the compound having the formula:

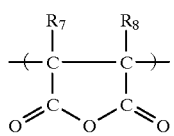
(VI)

wherein $R_7$ and $R_8$ are the same or different and are chosen from among hydrogen, linear or branched chain alkyl and substituted or unsubstituted carboxylic groups.

Grafting the terpolymer molecules of the present invention can be accomplished according to any technique known in the art. It is preferred that any grafting of the terpolymers of the present invention be accomplished by adding from about 1 to about 25 percent, more preferably from about 1 to about 15 percent, of a grafting agent, such as an anhydride according to Formula VI above, to a terpolymer according to the present invention in a twin screw extruder. Such post reaction grafting can make the final grafted polymer more flexible.

The present terpolymers are preferably used as materials for golf ball covers, cores, or intermediate layers either alone or in combination with other golf ball materials. The present terpolymers may be used in any amount that is effective to produce golf balls having desirable properties, and can be used in combination with other materials useful for forming golf ball covers, core, or intermediate layers, such as, for example, ionomers sold under the tradename SURLYN™ by Du Pont and IOTEK™ produced by Exxon. When used in combination with other golf ball materials, the present polymers can be used in any amount which will effect the final physical characteristics or flight performance, or will provide some advantage to a golf ball so produced, typically, from about 1 percent to about 90 percent of the weight of the blend. Preferably, from about 1 percent to about 70 percent, more preferably from about 1 percent to about 50 percent of the subject terpolymers are used.

Golf ball cover materials useful in the golf balls of the invention include the terpolymer described above, ionomers, thermoplastic copolymers and terpolymers, polyamides, polyurethanes, homo and copolyesters, polyamides, copolyetheresters, copolyesterester, copolyetheramides, copolyetheramide elastomers, polyurea, epoxy polymers, and mixtures thereof.

In golf balls comprising a cover, a core, and an intermediate layer between the cover and the core, where the intermediate layer comprises the terpolymer, the core may be formed from any material known in the art, including the terpolymer, blends of the terpolymer and one or more olefinic ionomers, and polybutadiene based compositions. Similarly, where the core comprises the terpolymer or a blend of the terpolymer and one or more olefinic ionomers, the intermediate layer may comprise a thermoplastic or thermoset material, such as those described above for the cover.

Additional components, well known in the art can be added to the golf ball compositions of the invention. In the case of golf ball covers, the additional components include U.V. stabilizers such as TINUVIN™ 213 and TINUVIN™ 328, for example. Also, light stabilizers such as, for example, TINUVIN™ 770 and TINUVIN™ 765, may also be used. TINUVIN™ products are available from Ciba-Geigy. Other dyes, as well as optical brighteners and fluorescent pigments and dyes may also be used in the golf ball covers produced with terpolymers formed according to the present invention. Such additional ingredients may be used in any amounts that will achieve their desired purpose. However conventional amounts include the range of from about 0.05 percent to about 1.5 percent or more preferably, from about 0.5 percent to about 1.0 percent.

Other conventional ingredients, e.g., fillers are well known to the person of ordinary skill in the art and may be included in the present invention in amounts effective to achieve their known purpose.

The optional filler component of the invention is chosen to impart additional density to blends of the previously described components, the selection being dependent upon the type of golf ball desired, i.e., one-piece, two-piece or three-piece, as will be more fully detailed below. Generally, the filler will be inorganic, having a density greater than about 4 gm/cc, preferably greater than 5 gm/cc, and will be present in amounts between 5 and 65 weight percent based on the total weight of the polymer components. Examples of useful fillers include zinc oxide, barium sulfate, lead silicate and tungsten carbide, as well as the other well known corresponding salts and oxides thereof. It is preferred that the filler components be non-reactive with the polymer components described above.

Additional optional additives useful in forming the golf balls of the present invention include acid copolymer waxes (e.g., Allied wax AC143 believed to be an ethylene/16–18 percent acrylic acid copolymer with a number average molecular weight of 2.040) that assist in preventing reaction between the filler materials (e.g., ZnO) and the acid moiety in the ethylene copolymer, optical brighteners, surfactants, processing aids, etc.

The present copolymers may be blended with any of the additional ingredients noted above to be used in a golf ball using any conventional blending technique. For example, the present compounds may be added to a vessel containing pelletized ionomer resins, and heated to from about 300° F. to about 500° F. Thorough mixing of the materials is accomplished by means of a screw in the heated vessel. Typically, covers are formed around solid or wound cores by either compression molding preformed half-shells of the cover stock material or by injection molding the cover stock about the core.

In compression molding, the half-shells of the stock material are made by injection molding the cover stock material into a half-shell mold at from about 300° F. to about 520° F. for a short time. The preformed half-shells are placed around a core to provide an assembly which is introduced into a conventional compression molding machinery such as that shown in U.S. Pat. No. 4,508,309. The ball is allowed to cool in the mold until the cover is hard enough to be handled without deforming. The balls then undergo conventional finishing operations such as buffing, painting and stamping. In addition to covers, cores and intermediate layers may also be formed with compression molding terchniques.

Golf ball covers, cores, and intermediate layers can also be formed by injection molding. For a cover or intermediate layer, a core or core assembly is placed in a mold cavity in an injection molding machine, and held in place through the use of several retractable pins. Such injection molding machines are well known in the art. The molten cover or intermediate layer material is injected into the cavity surrounding the core. As the cover or intermediate layer material cools and hardens, the pins retract and the molded ball or encapsulated core is ejected from the mold. The balls or encapsulated cores then undergo additional finishing operations with the covers typically being buffed, painted, and stamped. Where a core has been encapsulated with an intermediate layer, a cover must of course be applied to the encapsulated core in either manner described above to produce a finished ball.

The golf ball compositions of the invention may be used in any type of golf ball. Golf balls of varying size can also be used according to the present invention. The rules of golf dictate that a golf ball must have a diameter of at least 1.680 inches. However, non-conforming golf balls can be any size. Golf balls according to the present invention can range from 1.5 inches to 2.5 inches. The preferred range of diameters of golf balls is from about 1.680 to about 1.80 inches. The most preferred range is however from about 1.680 to about 1.750 inches.

EXAMPLES

In order to exemplify the results achieved using the novel golf ball materials of the present invention, the following examples are provided without any intent to limit the scope of the instant invention to the discussion therein, all parts and percentages are by weight unless otherwise indicated.

Examples 1–13x

In each of the following experimental trials numbered 1–13x, the relevant amounts of cover blend ingredients are mixed together to form a batch of cover stock. The relative amounts of the ingredients for each of cover stocks 1–13x is set forth in Table 1.

The following non-limiting examples are merely illustrative of the preferred embodiments of the present invention, and are not to be construed as limiting the invention, the scope of which is defined by the appended claims.

TABLE 1

| Ingredients | Sample | | | | | | | | | | | | | |
|---|---|---|---|---|---|---|---|---|---|---|---|---|---|---|
| | 1[1] | 2 | 3 | 4 | 5 | 6 | 7 | 8 | 9 | 10 | 11 | 12 | 13 | 13X |
| Surlyn 7930 | 50 | — | — | — | — | — | — | — | — | — | — | — | — | — |
| Surlyn 8920 | 30 | — | — | — | — | — | — | — | — | — | — | — | — | — |
| Surlyn 7940 | — | — | — | — | — | — | — | — | — | — | — | — | — | — |
| Surlyn 8320 | 20 | — | — | — | — | — | — | — | — | 5 | 5 | 5 | 5 | 5 |
| Surlyn AD8512 (high flow Na, 4.4 MI)[2] | — | 50 | 45 | 50 | 45 | 50 | 45 | 45 | 40 | 35 | 35 | 35 | 35 | 35 |
| Surlyn AD8511 high flow Zn, 3.4 MI)[2] | — | 40 | 40 | 40 | 40 | 20 | 20 | 40 | 40 | 20 | 20 | 40 | 40 | 40 |
| Surlyn 9020 (1.1 MI, Flex 14KPS)[2] | — | — | — | — | — | 20 | 20 | — | — | 20 | 20 | — | — | — |
| EP4126 (E28nBA/5 GMA, 200 MI)[2] | — | 5 | 5 | — | — | 5 | 5 | 5 | 5 | 5 | — | — | 5 | 5 |
| EXP 4934-6(E28-nBA-1.8 GMA 15 MI)[2] | — | — | — | 5 | 5 | — | — | — | — | — | 5 | 5 | — | — |
| Fusabond MF175D | — | — | — | — | — | — | — | 5 | 5 | 5 | 5 | 5 | 5 | 5 |

TABLE 1-continued

| Ingredients | Sample | | | | | | | | | | | | | |
|---|---|---|---|---|---|---|---|---|---|---|---|---|---|---|
| | 1[1] | 2 | 3 | 4 | 5 | 6 | 7 | 8 | 9 | 10 | 11 | 12 | 13 | 13X |
| (E30-nBA-10CO-1% MA)[3] Nucrel | — | 5 | 10 | 5 | 10 | 5 | 10 | 5 | 10 | 10 | 10 | 10 | 10 | 10 |
| RX9-1(E23-nBA-9.6 MAA25 MI)[2,4] | | | | | | | | | | | | | | |
| White Concentrate | 5 | 5 | 5 | 5 | 5 | 5 | 5 | 5 | 5 | 5 | 5 | 5 | 5 | 5 |

[1]Composition no. 1 was used as a control.
[2]ASTM D-1238 (condition E, 190° C. using a 2160 gram wt.) is used to determine the melt index ("MI").
[3]"MA" is maleic anhydride.
[4]"MAA" is methacrylic acid.

The cover stocks were used to make half-shells in a conventional half-shell injection molding machine which heats the cover stock to 400° F. (204° C.) and injects the fluid cover stock into molds. The half-shells were formed about the solid cores in a compression mold at 260°–280° F. (127°–138° C.) for 10 minutes to yield golf balls with diameters of about 1.68 inches (4.3 cm) and nominal cover thicknesses of about 0.04 inches (0.1 cm).

Each series of balls made from cover stocks 1–13x were tested for their physical properties, and their performance characteristics such as initial velocity, co-efficient of restitution, and cut resistance. The results from these tests are set out in Table II. As shown in Table II, golf balls having covers formed from the terpolymer materials categorized as nos. 2–8 have properties at least as good as, if not better than, those obtained with control formulation no. 1. In addition, terpolymer formulations 9–13x have properties at least as good as, if not better than control formulation no. 2 (see, e.g., Table II for a description of this control).

TABLE II

| | Sample | | | | | | |
|---|---|---|---|---|---|---|---|
| | 1 | 2 | 3 | 4 | 5 | 6 | 7 |
| I. Physicals | | | | | | | |
| Pole dia. avg. in. | 1.683 | 1.682 | 1.683 | 1.682 | 1.682 | 1.682 | 1.682 |
| Equator dia. avg. in. | 1.683 | 1.682 | 1.682 | 1.682 | 1.683 | 1.682 | 1.682 |
| Wght. avg. (grams) | 45.53 | 45.44 | 45.44 | 45.42 | 45.49 | 45.50 | 45.43 |
| PGA compression avg. | 106 | 107 | 107 | 107 | 107 | 107 | 106 |
| Shore-D Cover Hardness | 67 | 68 | 66 | 67 | 66 | 66 | 63 |
| II. Performance | | | | | | | |
| Initial Velocity (FPS) | 254.04 | 253.50 | 253.41 | 253.49 | 253.52 | 253.17 | 253.02 |
| Coefficient of Restitution | 0.816 | 0.819 | 0.809 | 0.812 | 0.810 | 0.808 | 0.807 |
| No. hits at RT for 50% failure | 600 | 600 | 650 | 842 | 33% fail @1000 hits | 830 | 25% fail @1000 hits |
| No. hits at RT for 1st failure | 200 | 200 | 350 | 600 | 650 | 250 | 650 |
| Cold Crack Test at 5 DEG. F. | No fail. | No fail. | No fail. | No fail. | No fail. | No fail. | No fail. |
| Cold Crack Test at −50 DEG. F. | No fail. | No fail. | No fail. | No fail. | No fail. | No fail. | No fail. |
| Shear Resistance Rating | 3.2 | 2.8 | 2.8 | 3.1 | 2.9 | 3.0 | 3.3 |
| Cut Resistance Rating | 5.9 | | | | 5.8 | | |
| Paint Durability | 0.5 | 0.5 | 1.5 | 0.5 | 0.5 | 0 | 0.5 |
| Spin Rate with Driver (RPM) | 3636 | 3413 | 3471 | 3433 | | 3460 | 3436 |
| Spin Rate with 8-Iron (RPM) | 9001 | 7925 | 8037 | 8002 | 9049 | 8127 | 8119 |

| | Sample | | | | | | | |
|---|---|---|---|---|---|---|---|---|
| | 8 | 9 | 10 | 11 | 12 | 13 | 13X | Control #2[5] |
| I. Physicals | | | | | | | | |
| Pole dia. avg. in. | 1.680 | 1.680 | 1.683 | 1.680 | 1.681 | 1.681 | 1.680 | |
| Equator dia. avg. in. | 1.681 | 1.682 | 1.682 | 1.682 | 1.683 | 1.682 | 1.682 | |
| Wght. avg. (grams) | 45.44 | 45.41 | 45.49 | 45.43 | 45.49 | 45.58 | 45.53 | |
| PGA compression avg. | 106 | 106 | 104 | 106 | 106 | 106 | 107 | |
| Shore-D Cover Hardness | 64 | 62 | 60 | 60 | 61 | 61 | 61 | 60 |
| II. Performance | | | | | | | | |
| Initial Velocity (FPS) | 253.22 | 253.20 | 252.80 | 253.02 | 252.99 | 252.99 | 253.42 | 253.06 |
| Coefficient of Restitution | 0.807 | 0.809 | 0.804 | 0.806 | 0.808 | 0.811 | 0.811 | 0.808 |
| No. hits at RT for 50% failure | No fail. | No fail. | No fail. | No fail. | 25% fail @1000 hits | 33% fail @1000 hits | 33% fail @1000 hits | 8% fail @1000 hits |
| No. hits at RT for 1st failure | No fail. | No fail. | No fail. | No fail. | 350 | 750 | 924 | 494 |

TABLE II-continued

| Cold Crack Test at 5 DEG. F. | No fail. | No fail. | No fail. | No fail. | No fail. | No fail. | No fail. | No fail. |
|---|---|---|---|---|---|---|---|---|
| Cold Crack Test at −50 DEG. F. | No fail. | No fail. | No fail. | No fail. | No fail. | No fail. | No fail. | No fail. |
| Shear Resistance Rating | 3.S | 3.6 | 4.0 | 4.0 | 3.8 | 4.0 | 4.3 | 3.8 |
| Paint Durability | 0 | 0.5 | 0 | 0.5 | 1 | 1 | 1 | 1.5 |
| Spin Rate with Driver (RPM) | 3522 | 3475 | 3420 | 3580 | 3781 | 3810 | 3606 | 3692 |
| Spin Rate with 8-Iron (RPM) | 8157 | 8137 | 8299 | 8408 | 9139 | 9230 | 9266 | 8233 |

Shear Rating: 3.0 - slight cover shear/paint damage
4.0 = moderate cover shear/fraying/slight material removed
Cut Resistant Rating: Lower number - better cur resistant
Paint Durability Rating: N = 0; SL = 1; M = 2; H = 4
[5]Control No. 2 is used to form the cover of a golf ball manufactured by the Acushnet Company sold under the trade name Titleist HP2.

The scope of the following claims is intended to encompass all obvious changes in the details, materials, and arrangement of parts that will occur to one of ordinary skill in the art.

We claim:

1. A golf ball comprising a cover and a core, wherein the core comprises polybutadiene and at least one terpolymer, which comprises: (a) a first monomeric component comprising an olefinic hydrocarbon monomer having from 2 to about 8 carbon atoms; (b) a second monomeric component wherein the second monomeric component is an unsaturated acrylate class ester having the formula:

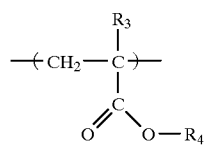

(II)

wherein $R_3$ is selected from the group consisting of hydrogen and linear and branched chain alkyl groups having from about 1 to about 20 carbon atoms, and $R_4$ is selected from the group consisting of linear and branched chain alkyl groups having from about 1 to about 20 carbon atoms; and (c) a third monomeric component comprising at least one monomer selected from the group consisting of carbon monoxide, anhydride monomers and monomers having a structure according to the following formula:

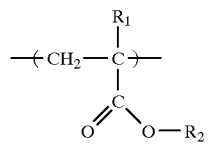

(I)

wherein $R_1$ is hydrogen or a linear chain or branched chain alkyl group of from about 1 to about 18 carbon atoms, and $R_2$ is selected from the group consisting of linear chain alkyl, branched chain alkyl, carbocyclic, and unsubstituted aryl groups, each containing an epoxy moiety.

2. The golf ball of claim 1, wherein the core comprises a blend of at least one olefinic ionomer and the terpolymer.

3. The golf ball of claim 1, wherein the first monomeric component comprises a vinyl olefin monomer having a terminal point of unsaturation capable of undergoing polymerization reactions.

4. The golf ball of claim 1, wherein the first monomeric component is selected from the group consisting of ethylene, propylene, butene, pentene, hexene, heptene and octene.

5. The golf ball of claim 1, wherein the second monomeric component comprises an acrylate class ester formed from an unsaturated carboxylic acid selected from the group consisting of acrylic acid, methacrylic acid, α-chloroacrylic acid, crotonic acid, maleic acid, fumaric acid, itaconic acid, cinnamic acid, and mixtures thereof.

6. The golf ball of claim 1, wherein the acrylate class esters are selected from the group consisting of pentyl acrylate, pentyl methacrylate, n-butyl acrylate, iso-butyl acrylate, n-butyl methacrylate, iso-butyl methacrylate, n-propyl acrylate, iso-propyl acrylate, n-propyl methacrylate, iso-propyl methacrylate, ethyl acrylate, ethyl methacrylate, methyl methacrylate, methyl acrylate, iso-bornyl acrylate, iso-bornyl methacrylate and tetrahydrofurfuryl acrylate.

7. The golf ball of claim 1, wherein the third monomeric component is carbon monoxide.

8. The golf ball of claim 1, wherein the third monomeric component is an anhydride monomer having the formula

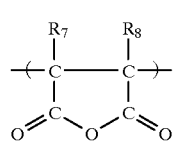

(VI)

wherein $R_7$ and $R_8$ are the same or different, and are selected from the group consisting of hydrogen, linear and branched chain alkyl, and carbocyclic groups.

9. The golf ball of claim 1, wherein the third monomeric component is a monomer having the general formula

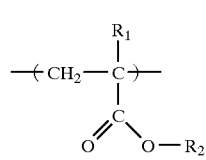

(I)

wherein $R_1$ is hydrogen or a linear chain or branched chain alkyl group of from about 1 to about 18 carbon atoms, and $R_2$ is selected from linear and branched chain alkyl, carbocyclic, and aryl groups, each containing an epoxy moiety.

10. The golf ball of claim 1, wherein the core comprises a terpolymer having the following formula:

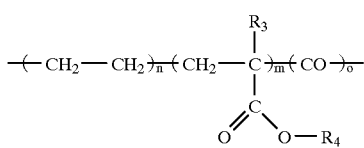
(III)

wherein $R_3$ and $R_4$ are selected from among hydrogen and linear and branched chain alkyl groups having from about 1 to about 20 carbon atoms.

11. The golf ball of claim 1, wherein the core comprises a terpolymer having the following formula:

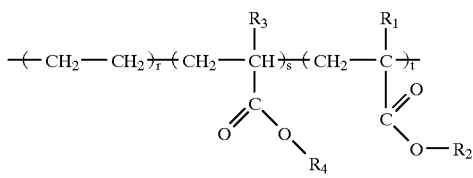
(IV)

wherein $R_1$ is hydrogen or a linear chain or branched chain alkyl group of from about 1 to about 18 carbon atoms, and $R_2$ is selected from the group consisting of linear chain and branched chain alkyl, substituted and unsubstituted carbocyclic and unsubstituted aryl groups, each containing an epoxy moiety, and wherein $R_3$ and $R_4$ are selected from the group consisting of hydrogen and linear and branched chain alkyl groups having from about 1 to about 20 carbon atoms.

12. The golf ball of claim 1, further comprising an intermediate layer between the cover and the core.

13. The golf ball of claim 12, wherein the intermediate layer comprises the terpolymer.

14. The golf ball of claim 12, wherein the intermediate layer comprises a thermoplastic or thermoset material.

15. The golf ball of claim 1, wherein the cover comprises a material selected from the group consisting of the terpolymer, ionomers, thermoplastic copolymers and terpolymers, polyamides, polyurethanes, homo and copolyesters, polyamides, copolyetheresters, copolyesterester, copolyetheramides, copolyetheramide elastomers, polyurea, epoxy polymers, and mixtures thereof.

16. A golf ball comprising a cover, a core, and an intermediate layer between the cover and the core, wherein at least one of the core and the intermediate layer comprises polybutadiene and at least one terpolymer, which comprises: (a) a first monomeric component comprising an olefinic hydrocarbon monomer having from 2 to about 8 carbon atoms; (b) a second monomeric component wherein the second monomeric component is an unsaturated acrylate class ester having the formula:

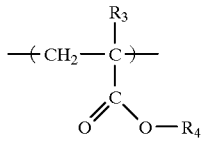
(II)

wherein $R_3$ is selected from the group consisting of hydrogen and linear and branched chain alkyl groups having from about 1 to about 20 carbon atoms, and $R_4$ is selected from the group consisting of linear and branched chain alkyl groups having from about 1 to about 20 carbon atoms; and (c) a third monomeric component comprising at least one monomer selected from the group consisting of carbon monoxide, anhydride monomers and monomers having a structure according to the following formula;

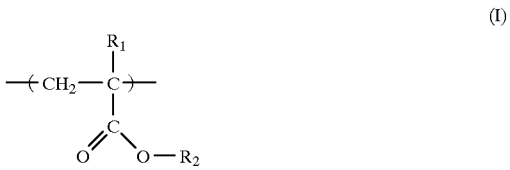
(I)

wherein $R_1$ is hydrogen or a linear chain or branched chain alkyl group of from about 1 to about 18 carbon atoms, and $R_2$ is selected from the group consisting of linear chain alkyl, branched chain alkyl, carbocyclic, and unsubstituted aryl groups, each containing an epoxy moiety.

17. The golf ball of claim 16, wherein the intermediate layer comprises the terpolymer, and the core comprises polybutadiene.

18. The golf ball of claim 16, wherein the intermediate layer comprises a blend of at least one olefinic ionomer and the terpolymer.

19. The golf ball of claim 16, wherein the core comprises the terpolymer.

20. The golf ball of claim 19, wherein the core comprises a blend of at least one olefinic ionomer and the terpolymer.

21. The golf ball of claim 16, wherein the cover comprises a material selected from the group consisting of the terpolymer, ionomers, thermoplastic copolymers and terpolymers, polyamides, polyurethanes, homo and copolyesters, polyamides, copolyetheresters, copolyesterester, copolyetheramides, copolyetheramide elastomers, polyurea, epoxy polymers, and mixtures thereof.

22. The golf ball of claim 16, wherein the first monomeric component is selected from the group consisting of ethylene, propylene, butene, pentene, hexene, heptene and octene.

23. The golf ball of claim 16, wherein the second monomeric component comprises an acrylate class ester formed from an unsaturated carboxylic acid selected from the group consisting of acrylic acid, methacrylic acid, α-chloroacrylic acid, crotonic acid, maleic acid, fumaric acid, itaconic acid, cinnamic acid, and mixtures thereof.

24. The golf ball of claim 17, wherein the acrylate class esters are selected from the group consisting of pentyl acrylate, pentyl methacrylate, n-butyl acrylate, iso-butyl acrylate, n-butyl methacrylate, propyl acrylate, propyl methacrylate, ethyl acrylate, ethyl methacrylate, methyl methacrylate, methyl acrylate, iso-bornyl acrylate, iso-bornyl methacrylate and tetrahydrofurfuryl acrylate.

25. The golf ball of claim 16, wherein the third monomeric component is carbon monoxide.

26. The golf ball of claim 16, wherein the third monomeric component is an anhydride monomer having the formula

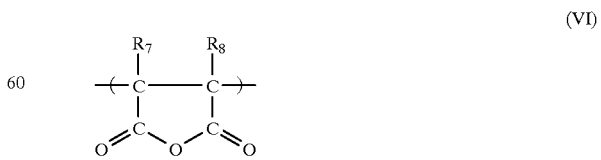
(VI)

wherein $R_7$ and $R_8$ are the same or different, and are selected from the group consisting of hydrogen, linear and branched chain alkyl, and carbocyclic groups.

27. The golf ball of claim 16, wherein the third monomeric component is a monomer having the general formula

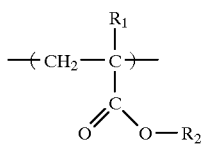
(I)

wherein $R_1$ is hydrogen or a linear chain or branched chain alkyl group of from about 1 to about 18 carbon atoms, and $R_2$ is selected from linear or branched chain alkyl, carbocyclic, and aryl groups, each containing an epoxy moiety.

28. The golf ball of claim 16, wherein the terpolymer has the following formula:

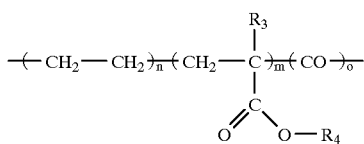
(III)

wherein $R_3$ and $R_4$ are selected from the group consisting of hydrogen and linear and branched chain alkyl groups having from about 17 to about 20 carbon atoms.

29. The golf ball of claim 16, wherein the terpolymer has the following formula:

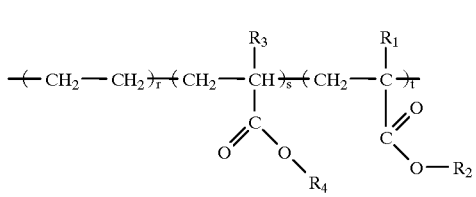
(IV)

wherein $R_1$ is hydrogen or a linear chain or branched chain alkyl group of from about 1 to about 18 carbon atoms, and $R_2$ is selected from the group consisting of linear chain and branched chain alkyl, substituted and unsubstituted carbocyclic and unsubstituted aryl groups, each containing an epoxy moiety, and wherein $R_3$ and $R_4$ are selected from among hydrogen and linear and branched chain alkyl groups having from about 1 to about 20 carbon atoms.

30. A golf ball comprising a cover, a core, and an intermediate layer between the cover and the core, wherein the intermediate layer comprises at least one terpolymer, which comprises: (a) a first monomeric component comprising an olefinic hydrocarbon monomer having from 2 to about 8 carbon atoms; (b) a second monomeric component wherein the second monomeric component is an unsaturated acrylate class ester having the formula:

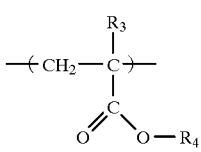
(II)

wherein $R_3$ is selected from the group consisting of hydrogen and linear and branched chain alkyl groups having from about 1 to about 20 carbon atoms, and $R_4$ is selected from the group consisting of linear and branched chain alkyl groups having from about 1 to about 20 carbon atoms; and (c) a third monomeric component comprising at least one monomer selected from the group consisting of carbon monoxide, anhydride monomers and monomers having a structure according to the following formula;

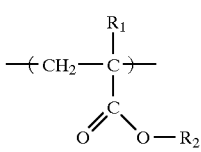
(I)

wherein $R_1$ is hydrogen or a linear chain or branched chain alkyl group of from about 1 to about 18 carbon atoms, and $R_2$ is selected from the group consisting of linear chain alkyl, branched chain alkyl, carbocyclic, and unsubstituted aryl groups, each containing an epoxy moiety.

31. The golf ball of claim 30, wherein the intermediate layer comprises a blend of at least one olefinic ionomer and the terpolymer.

* * * * *

UNITED STATES PATENT AND TRADEMARK OFFICE
CERTIFICATE OF CORRECTION

PATENT NO. : 5,971,869

DATED : October 26, 1999

INVENTOR(S) : Murali Rajagopalan *and* Robert Joseph Statz

It is certified that error appears in the above-identified patent and that said Letters Patent is hereby corrected as shown below:

At column 18, line 45, in claim 24, change "The golf ball of claim 17," to --The golf ball of claim 16,--.

Signed and Sealed this

Twenty-seventh Day of March, 2001

*Attest:*

*Attesting Officer*

NICHOLAS P. GODICI

*Acting Director of the United States Patent and Trademark Office*